(12) United States Patent
Yoshinari et al.

(10) Patent No.: US 11,211,868 B2
(45) Date of Patent: Dec. 28, 2021

(54) DC POWER SUPPLY DEVICE

(71) Applicant: Koki Holdings Co., Ltd., Tokyo (JP)

(72) Inventors: Takuya Yoshinari, Ibaraki (JP); Yuji Kishima, Ibaraki (JP)

(73) Assignee: Koki Holdings Co., Ltd., Tokyo (JP)

( * ) Notice: Subject to any disclaimer, the term of this patent is extended or adjusted under 35 U.S.C. 154(b) by 0 days.

(21) Appl. No.: 16/766,701

(22) PCT Filed: Oct. 31, 2018

(86) PCT No.: PCT/JP2018/040519
§ 371 (c)(1),
(2) Date: May 24, 2020

(87) PCT Pub. No.: WO2019/107052
PCT Pub. Date: Jun. 6, 2019

(65) Prior Publication Data
US 2020/0295659 A1 Sep. 17, 2020

(30) Foreign Application Priority Data

Nov. 30, 2017 (JP) .............................. JP2017-231268
Nov. 30, 2017 (JP) .............................. JP2017-231269
Nov. 30, 2017 (JP) .............................. JP2017-231270

(51) Int. Cl.
*H02J 7/00* (2006.01)
*H02M 3/28* (2006.01)
(Continued)

(52) U.S. Cl.
CPC ................ *H02M 3/28* (2013.01); *B25F 5/02* (2013.01); *H01M 50/20* (2021.01); *H02M 7/06* (2013.01);
(Continued)

(58) Field of Classification Search
CPC ......... H02P 27/06; B23D 45/16; B23D 47/12; B25F 5/02; H02M 7/5387; H02M 7/12;
(Continued)

(56) References Cited

U.S. PATENT DOCUMENTS

2004/0232892 A1* 11/2004 Aradachi .............. H02J 7/0091
320/150
2013/0154584 A1* 6/2013 Sakaue ..................... G05F 1/46
323/234
(Continued)

FOREIGN PATENT DOCUMENTS

EP 1017149 7/2000
EP 1903657 3/2008
(Continued)

OTHER PUBLICATIONS

"International Search Report (Form PCT/ISA/210) of PCT/JP2018/040519," dated Jan. 22, 2019, with English translation thereof, pp. 1-3.
(Continued)

*Primary Examiner* — Jared Fureman
*Assistant Examiner* — Esayas G Yeshaw
(74) *Attorney, Agent, or Firm* — JCIPRNET

(57) ABSTRACT

Provided is a DC power supply device If an electrical tool (81) of a rated voltage of 36 V is connected to the DC power supply device (1) (if the voltage of a lower positive terminal indicates the presence of a short bar), a microcomputer (30) performs control so as to switch a switching element (Q1) on and output a DC voltage of 36 V between an upper positive terminal and the upper negative terminal. If an electrical tool (81) of a rated voltage of 18 V is connected to the DC power supply device (1) (if the voltage of the lower positive terminal indicates the absence of a short bar), the microcomputer (30) performs control so as to switch a switching
(Continued)

element (Q2) on and output a DC voltage of 18 V between the upper positive terminal and the upper negative terminal.

14 Claims, 11 Drawing Sheets

(51) Int. Cl.
    *B25F 5/02*      (2006.01)
    *H02M 7/06*      (2006.01)
    *H02M 7/5387*    (2007.01)
    *H01M 50/20*     (2021.01)
    B23D 45/16       (2006.01)
    B23D 47/12       (2006.01)
    B25B 21/02       (2006.01)
    H02P 27/06       (2006.01)

(52) U.S. Cl.
    CPC ............ *H02M 7/5387* (2013.01); *B23D 45/16* (2013.01); *B23D 47/12* (2013.01); *B25B 21/02* (2013.01); *H01M 2220/30* (2013.01); *H02P 27/06* (2013.01)

(58) Field of Classification Search
    CPC ...... H02M 3/28; H02M 7/06; H01M 2220/30; H01M 50/20; Y02E 60/10; B25B 21/02
    See application file for complete search history.

(56) References Cited

U.S. PATENT DOCUMENTS

| | | | | |
|---|---|---|---|---|
| 2013/0334898 | A1* | 12/2013 | Kao | H02M 7/02 |
| | | | | 307/151 |
| 2017/0033680 | A1* | 2/2017 | Li | H02M 1/36 |
| 2017/0069884 | A1 | 3/2017 | Beddow et al. | |
| 2017/0364050 | A1* | 12/2017 | Castelli | G05B 9/02 |
| 2018/0004186 | A1* | 1/2018 | Tanaka | G05B 19/406 |
| 2020/0243271 | A1* | 7/2020 | Koyama | H01H 9/061 |

FOREIGN PATENT DOCUMENTS

| | | |
|---|---|---|
| JP | H11101836 | 4/1999 |
| JP | H11262172 | 9/1999 |
| JP | 2005278375 | 10/2005 |
| JP | 2013046481 | 3/2013 |

OTHER PUBLICATIONS

"Search Report of Europe Counterpart Application", dated Jul. 19, 2021, pp. 1-11.

* cited by examiner

DC POWER SUPPLY DEVICE

CROSS-REFERENCE TO RELATED APPLICATION

This application is a 371 application of the international PCT application serial no. PCT/JP2018/040519, filed on Oct. 31, 2018, which claims the priority benefit of Japan applications no. 2017-231268, filed on Nov. 30, 2017; no. 2017-231269, filed on Nov. 30, 2017; and no. 2017-231270, filed on Nov. 30, 2017. The entirety of each of the above-mentioned patent applications is hereby incorporated by reference herein and made a part of this specification.

BACKGROUND OF THE INVENTION

Technical Field

The present invention relates to a DC power supply device that converts an AC current supplied from an external AC power supply into a DC current and supplies the DC current to an electrical tool.

Related Art

Conventionally, there is known a DC power supply device that is connected to a battery attaching/detaching unit of a cordless electrical tool, converts an external AC power supply into a DC power supply, and supplies the DC power supply as a drive power supply to the electrical tool. In general, when the DC power supply device is connected to an external AC power supply, an internal circuit is driven. Thus, even in a state that the DC power supply device is not connected to an electrical tool, the DC power supply device comes into a state of being capable of outputting a DC power supply (state that a DC voltage is applied between a positive-side output terminal and a negative-side output terminal).

LITERATURE OF RELATED ART

Patent Literature

Patent Literature 1: Japanese Patent Laid-Open No. 2005-278375

SUMMARY

Problems to be Solved

Conventionally, in order to connect a DC power supply device to various electrical tools having different rated voltages, a converter and an adapter are arranged as separated units, and a different adapter is used for each rated voltage of the electrical tool, and thus use of common parts is hindered. In addition, the DC power supply device has internal circuits such as a transformer. Hence, in a state that a DC voltage is applied between a positive-side output terminal and a negative-side output terminal, the DC power supply device consumes electric power due to an operation of the internal circuits even when the DC power supply device is not connected to the electrical tool, and there is room for improvement in terms of a reduction in power consumption. In addition, if the DC power supply device stops output to the electrical tool due to abnormality, and the abnormality is solved while a trigger of the electrical tool is in an ON-state, there is an unexpected re-start of the electrical tool to a user in some cases when the output from the DC power supply device to the electrical tool is automatically re-started, and thus there is room for improvement in terms of a feeling of use.

The present invention is made in recognition of the above circumstances, and a first object thereof is to provide a DC power supply device that is suitable for being connected in common to a plurality of electrical tools having different rated voltages or for reducing power consumption.

A second object of the present invention is to provide a DC power supply device that is capable of inhibiting a connected electrical tool from being unexpectedly started.

Means to Solve Problems

According to a first aspect of the present invention, a DC power supply device is provided. The DC power supply device is connected to an external AC power supply and an electrical tool, converts an AC current supplied from the AC power supply into a DC current and supplies the DC current to the electrical tool. The DC power supply device includes: a detection part that detects information of the electrical tool that has been connected; and a switching circuit that switches between voltage values of the DC current which is supplied to the electrical tool, depending on a detection result obtained by the detection part.

The information may contain information of a rated voltage of the electrical tool that has been connected.

The DC power supply device may include: a connector unit that is connected to the external AC power supply; a cable unit having the connector unit at one end; and an adapter unit that is arranged at the other end of the cable unit and has the detection part, a connection unit, the switching circuit, and a conversion part that converts the AC current supplied from the AC power supply into the DC current. The conversion part may have a rectifying circuit and a voltage transforming circuit. The adapter unit may have an output terminal that is arranged at the connection unit and outputs the DC current to the electrical tool.

The adapter unit may have a housing and a fan, wherein the housing has an air inlet and an air outlet and accommodates the detection part, the rectifying circuit, and the voltage transforming circuit, and the fan is arranged in the housing and generates an air flow from the air inlet to the air outlet.

The adapter unit may have a first substrate which extends in a first direction in the housing. The output terminal may be arranged on a first surface side of the first substrate. The rectifying circuit and the voltage transforming circuit may be arranged on a second surface side of the first substrate. The first substrate may be positioned between the air inlet and the air outlet in the first direction.

The connection unit may be capable of being selectively connected to an electrical tool having a first rated voltage and an electrical tool having a second rated voltage lower than the first rated voltage. The switching circuit may output, to the output terminal, voltages from both ends on a secondary side of the voltage transforming circuit when the detection result obtained by the detection part indicates the first rated voltage, and the switching circuit may output, to the output terminal, a voltage between a center tap and one end on the secondary side of the voltage transforming circuit when the detection result obtained by the detection part indicates the second rated voltage.

The connection unit may be capable of being selectively connected to an electrical tool having a first rated voltage and an electrical tool having a second rated voltage lower than the first rated voltage. The switching circuit may set the voltage value to a first voltage when the detection result obtained by the detection part indicates the first rated voltage, and the switching circuit may not supply the DC voltage to the electrical tool when the detection result obtained by the detection part indicates the second rated voltage.

The information may contain information on a state of the electrical tool. The switching circuit may be a stopping part which stops output of a DC voltage to an output unit, depending on the detection result obtained by the detection part.

The DC power supply device may include: an input unit to which an AC voltage from the external AC power supply is input; and a voltage transforming circuit arranged between the input unit and the output unit. The stopping part may stop the output of the DC voltage to the output unit by cutting off an input current to the voltage transforming circuit.

The detection part may have a connection-state detection terminal which receives a signal indicating connection of the electrical tool, and the stopping part may stop the output of the DC voltage to the output unit when the detection part does not receive the signal indicating the connection of the electrical tool.

The DC power supply device may have a control unit which switches between whether or not the stopping part stops the output of the DC voltage to the output unit, a control-system power-supply unit which generates an operation voltage of the control unit, and a cut-off part that cuts off supply of the operation voltage from the control-system power-supply unit to the control unit when the stopping part stops the output of the DC voltage to the output unit.

According to a second aspect of the present invention, a DC power supply device is provided. The DC power supply device is connected to an external AC power supply and an electrical tool, converts an AC current supplied from the AC power supply into a DC current and supplies the DC current to the electrical tool. The DC power supply device includes: an abnormality detection part; a state detection part that detects a state of the electrical tool; an output unit that supplies the DC current to the electrical tool; and a cut-off part that cuts off output of the DC current to the output unit when the abnormality detection part detects abnormality. If the output is cut off due to the abnormality, the cut-off part cancels cut-off of the output according to a requirement condition that a predetermined state is detected by the state detection part.

The cut-off part may cancel the cut-off of the output when the abnormality is eliminated and when the predetermined state is detected by the state detection part.

The predetermined state may be a state that a stop operation of an operation unit is performed, wherein the operation unit instructs driving and stopping of the electrical tool.

The DC power supply device may include: a connector unit that is connected to the external AC power supply; a cable unit having the connector unit at one end; an adapter unit that is arranged at the other end of the cable unit and has a connection unit which is connected to the electrical tool; a first light emitting unit that turns on when abnormality is detected by the abnormality detection part; and a second light emitting unit that turns on when the electrical tool is connected to the DC power supply device. The first and second light emitting units may be arranged on a side of an extension origin of the cable unit, on a housing of the adapter unit.

Moreover, an optional combination of configurational elements described above or an example in which there is a change in description of the present invention in a method, a system, and the like is also valid as an aspect of the present invention.

Effect

According to the first aspect of the present invention, it is possible to provide a DC power supply device that is suitable for being connected in common to a plurality of electrical tools having different rated voltages or for reducing power consumption.

According to the second aspect of the present invention, it is possible to provide a DC power supply device that is capable of inhibiting a connected electrical tool from being unexpectedly started.

BRIEF DESCRIPTION OF THE DRAWINGS

FIG. 12 is a circuit diagram illustrating a state that a DC power supply device 3 according to Embodiment 3 of the present invention is connected to the external AC power supply 50 and an electrical tool 81a.

DESCRIPTION OF THE EMBODIMENTS

Figure 1:
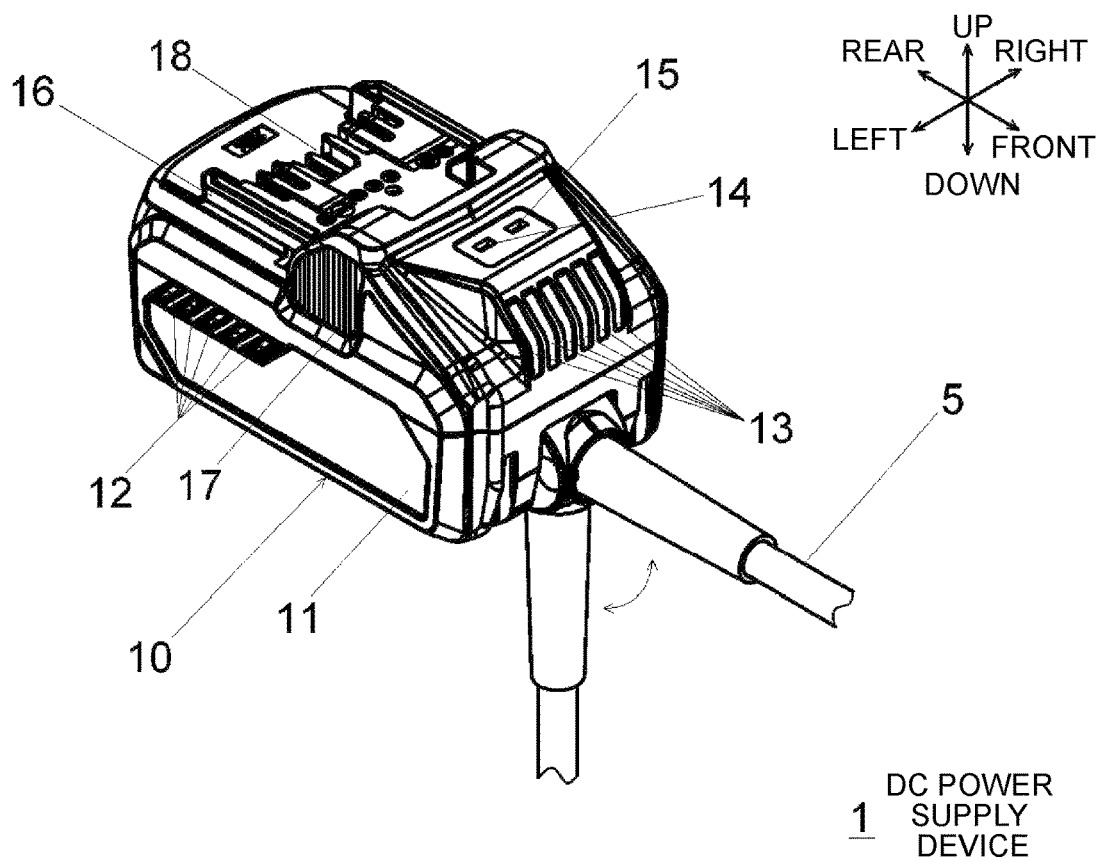
FIG. 1 is a perspective view of a DC power supply device 1 according to Embodiment 1 of the present invention.
Figure 2:
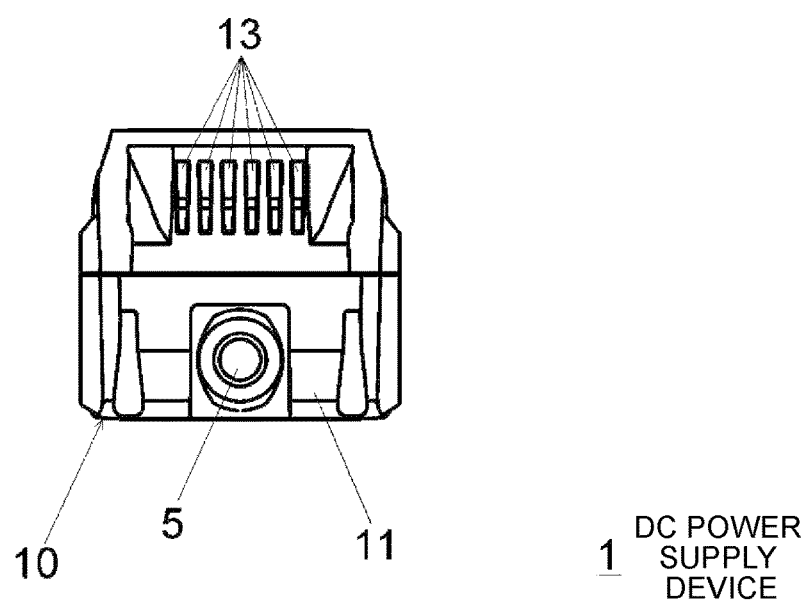
FIG. 2 is a front view of the DC power supply device.
Figure 3:
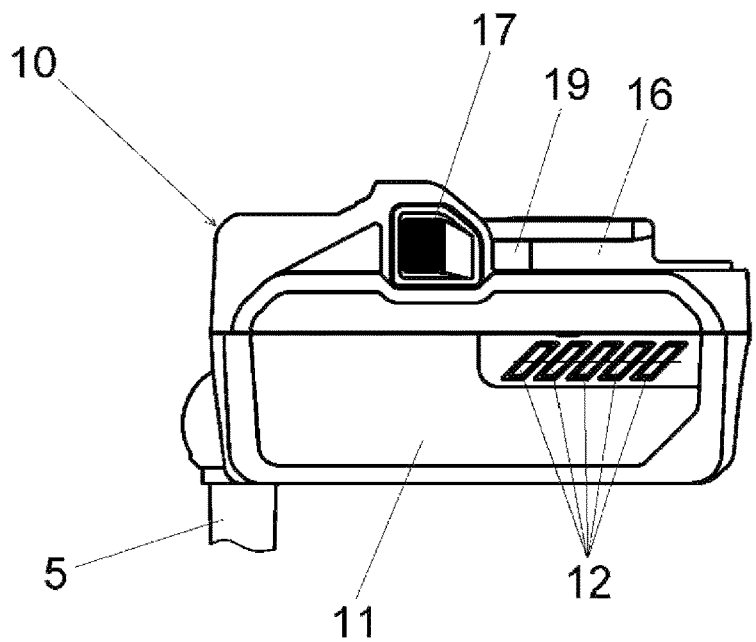
FIG. 3 is a right-side view of the DC power supply device.
Figure 4:
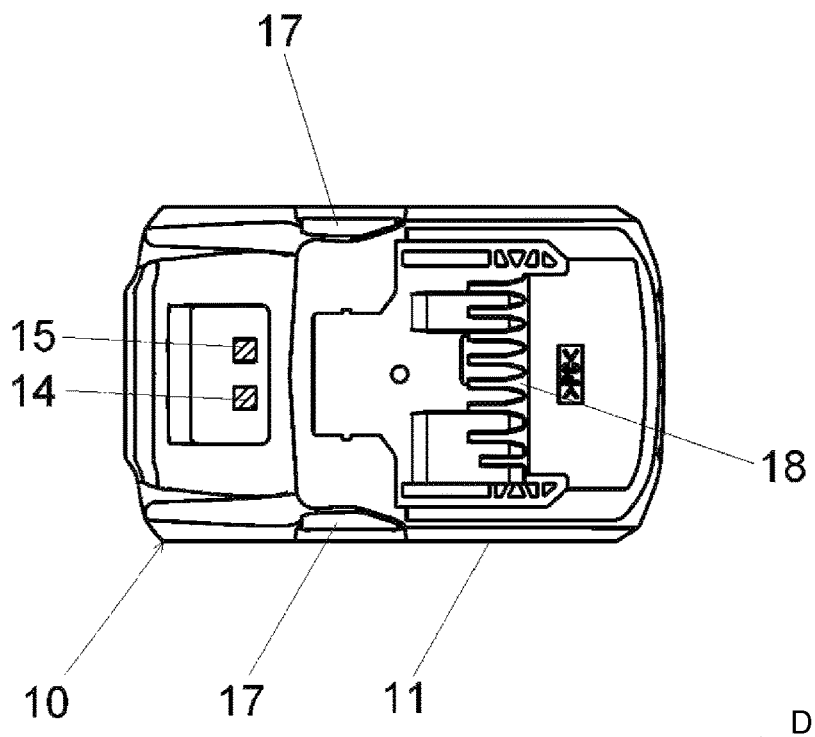
FIG. 4 is a plan view of the DC power supply device.
Figure 5:
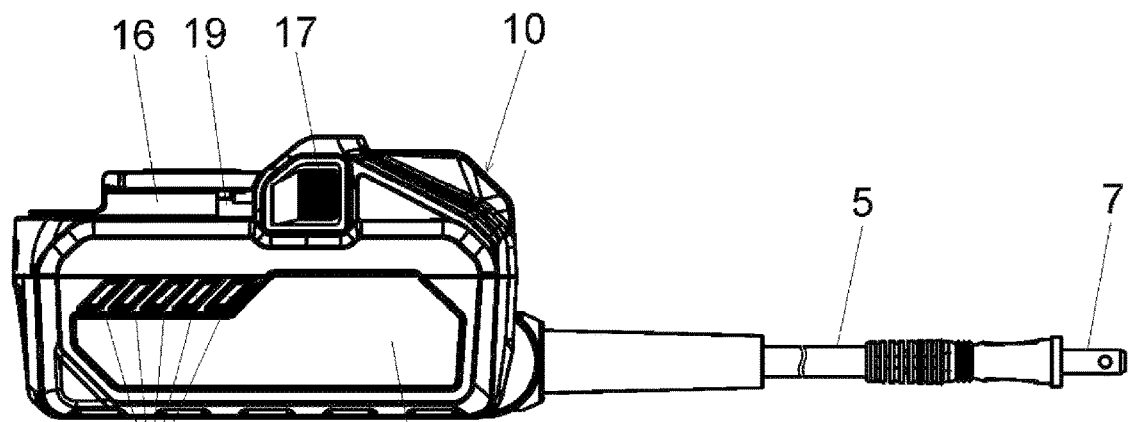
FIG. 5 is a left-side view of the DC power supply device.

Hereinafter, preferred embodiments of the present invention are described in detail with reference to the drawings. Moreover, the same reference signs are assigned to the same or equivalent configurational elements, members, and the like illustrated in the drawings, and the repeated description thereof is appropriately omitted. In addition, the invention is not limited to the embodiments, and the embodiments are provided as examples of the invention. Characteristics or combinations thereof which are described in the embodiments are not all necessarily essential to the invention.

Embodiment 1

With reference to FIGS. 1 to 7, a mechanical configuration of a DC power supply device 1 according to Embodiment 1 of the present invention is described. Front-rear, up-down, and right-left directions which are orthogonal to each other in the DC power supply device 1 are defined as illustrated in FIG. 1. The DC power supply device 1 includes a plug unit 7 (FIG. 5) serving as a connector unit which is connected to an external AC power supply, a cable unit 5 which has the plug unit 7 at one end, and an adapter unit 10 arranged at the other end of the cable unit 5. As illustrated in FIG. 1, the cable unit 5 extends from a lower front portion of the adapter unit 10, and an extending direction of the cable unit 5 from the adapter unit 10 is variable from a front direction to a down direction.

Figure 8:
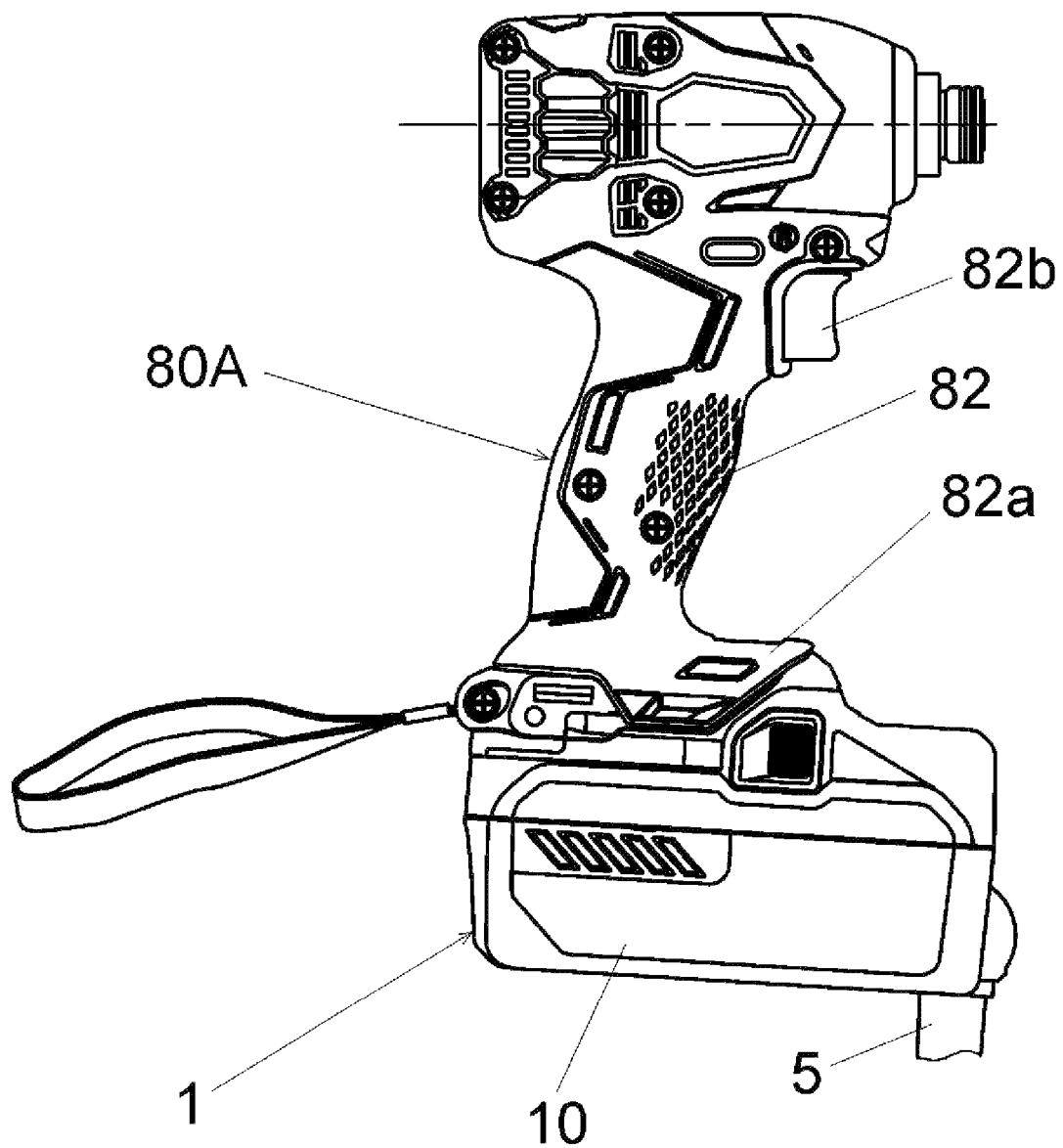
FIG. 8 is a side view illustrating a state that an adapter unit 10 of the DC power supply device 1 is connected to an impact driver 80A.
Figure 9:
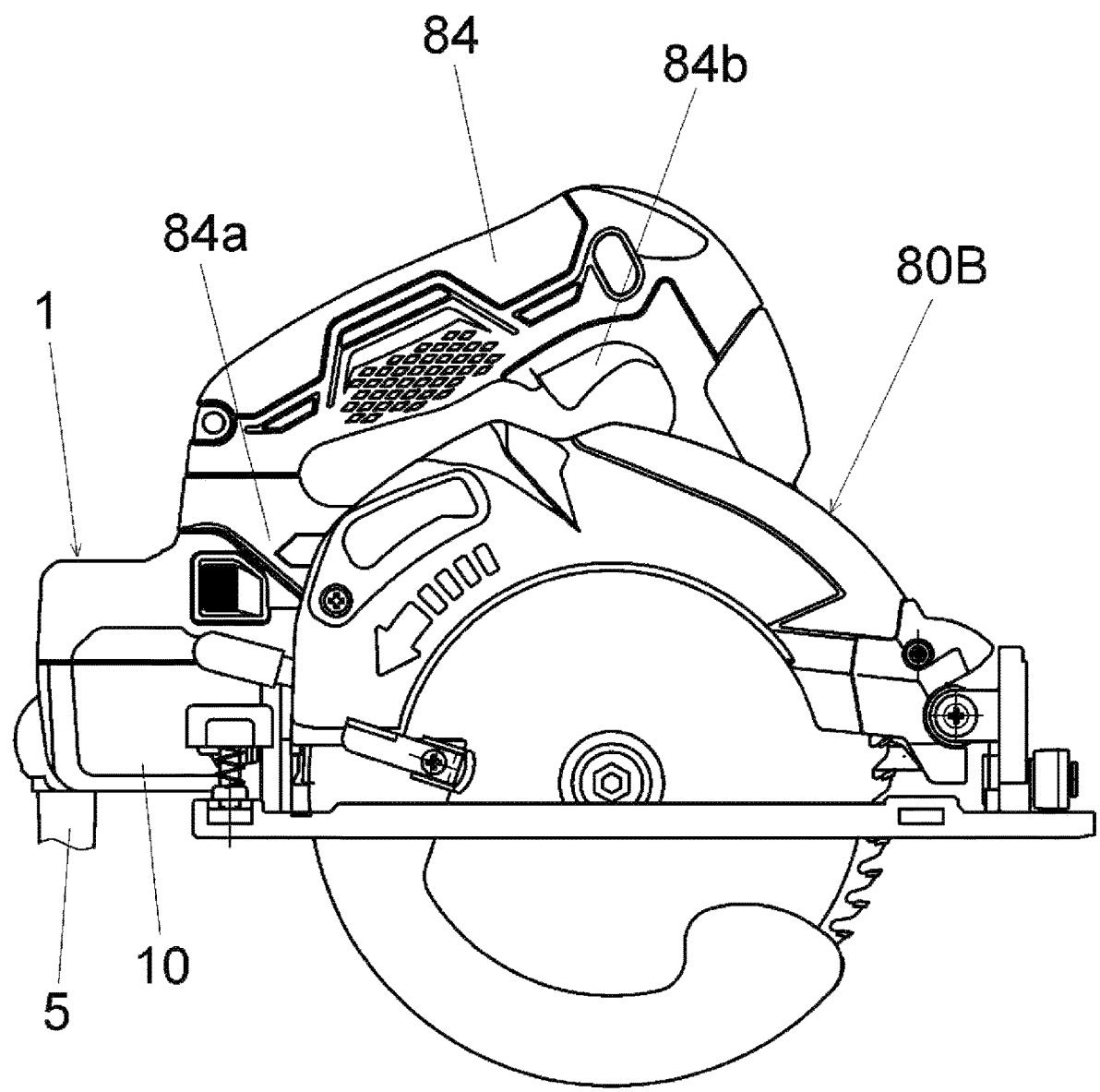
FIG. 9 is a side view illustrating a state that the adapter unit 10 is connected to a portable circular saw 80B.

The adapter unit 10 has a housing 11 having substantially the same shape as that of a housing of a battery pack which is used as a power supply of a cordless electrical tool (hereinafter, simply described as a "battery pack"). The adapter unit 10 also has the same terminal structure as that of the battery pack and is detachably connected (installed) to a battery attaching/detaching unit of the electrical tool instead of the battery pack. In addition, the adapter unit 10 can be connected in common to a plurality of electrical tools having different rated voltages. For example, as illustrated in FIG. 8, the adapter unit 10 is detachably connected to a battery attaching/detaching unit 82a at a lower end portion of a handle unit 82 of an impact driver 80A which is a cordless electrical tool having a rated voltage of 18 V (example of a second rated voltage). Otherwise, as illustrated in FIG. 9, the adapter unit 10 is detachably connected to a battery attaching/detaching unit 84a at a lower portion of a rear end of a handle unit 84 of a portable circular saw 80B which is a cordless electrical tool having a rated voltage of 36 V (example of a first rated voltage). A trigger (operation unit) 82b is arranged at an upper end portion of the handle unit 82 of the impact driver 80A illustrated in FIG. 8. A trigger (operation unit) 84b is arranged at a front end portion of the handle unit 84 of the portable circular saw 80B illustrated in FIG. 9.

The housing 11 of the adapter unit 10 has air inlets 12 at both right and left side surfaces and has air outlets 13 at an upper portion of a front surface. In addition, similarly to the battery pack, the housing 11 has rails 16 at right and left sides, respectively, the rails becoming a guide when the housing slides to be connected to the electrical tool. Similarly to the battery pack, a latch mechanism is arranged on the housing 11 for engagement to the electrical tool, the latch mechanism including a pair of right and left latch operation unit 17 and a latch projection portion 19 (FIGS. 3 and 5) which is switched between projection and non-projection toward the rails 16 by the latch operation unit 17. A plurality of slits 18 for terminal connection is arranged at an upper surface of the housing 11. A terminal 35 illustrated in FIG. 6 faces the outside from the slits 18. A first LED 14 and a second LED 15 as first and second light emitting units are arranged at the upper surface on a front side (side of an extension origin of the cable unit 5) of the housing 11. The first LED 14 is, for example, a red LED that is turned on when abnormality is detected. The second LED 15 is, for example, a green LED that is turned on when the adapter unit 10 is connected to the electrical tool.

Figure 6:
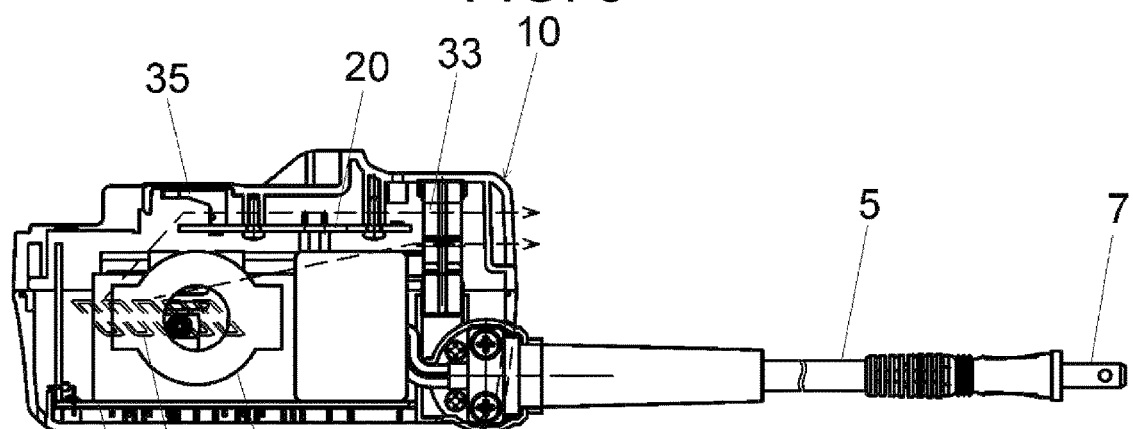
FIG. 6 is a cross-sectional left-side view of the DC power supply device.
Figure 7:
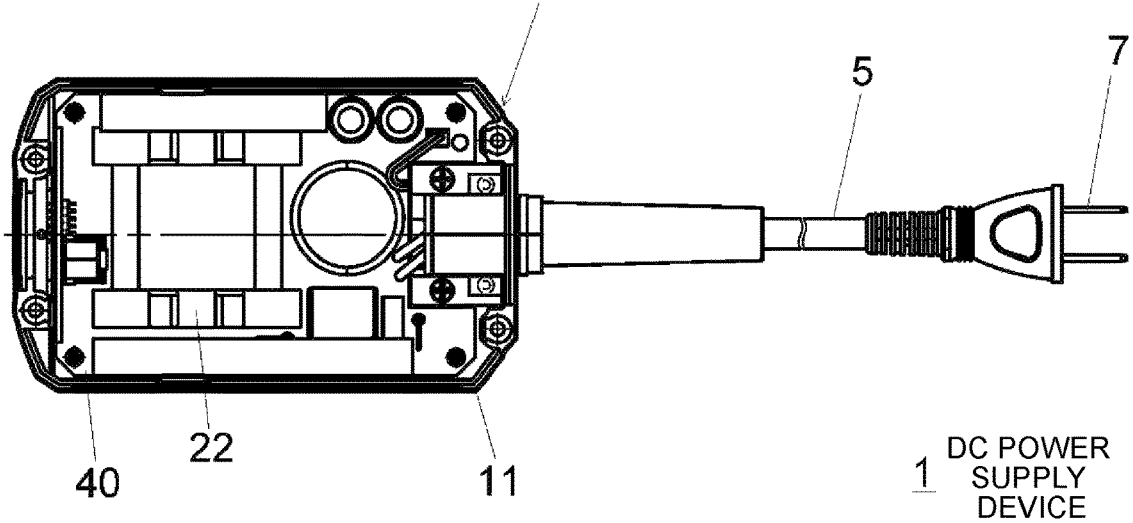
FIG. 7 is a cross-sectional plan view of the DC power supply device.
Figure 10:
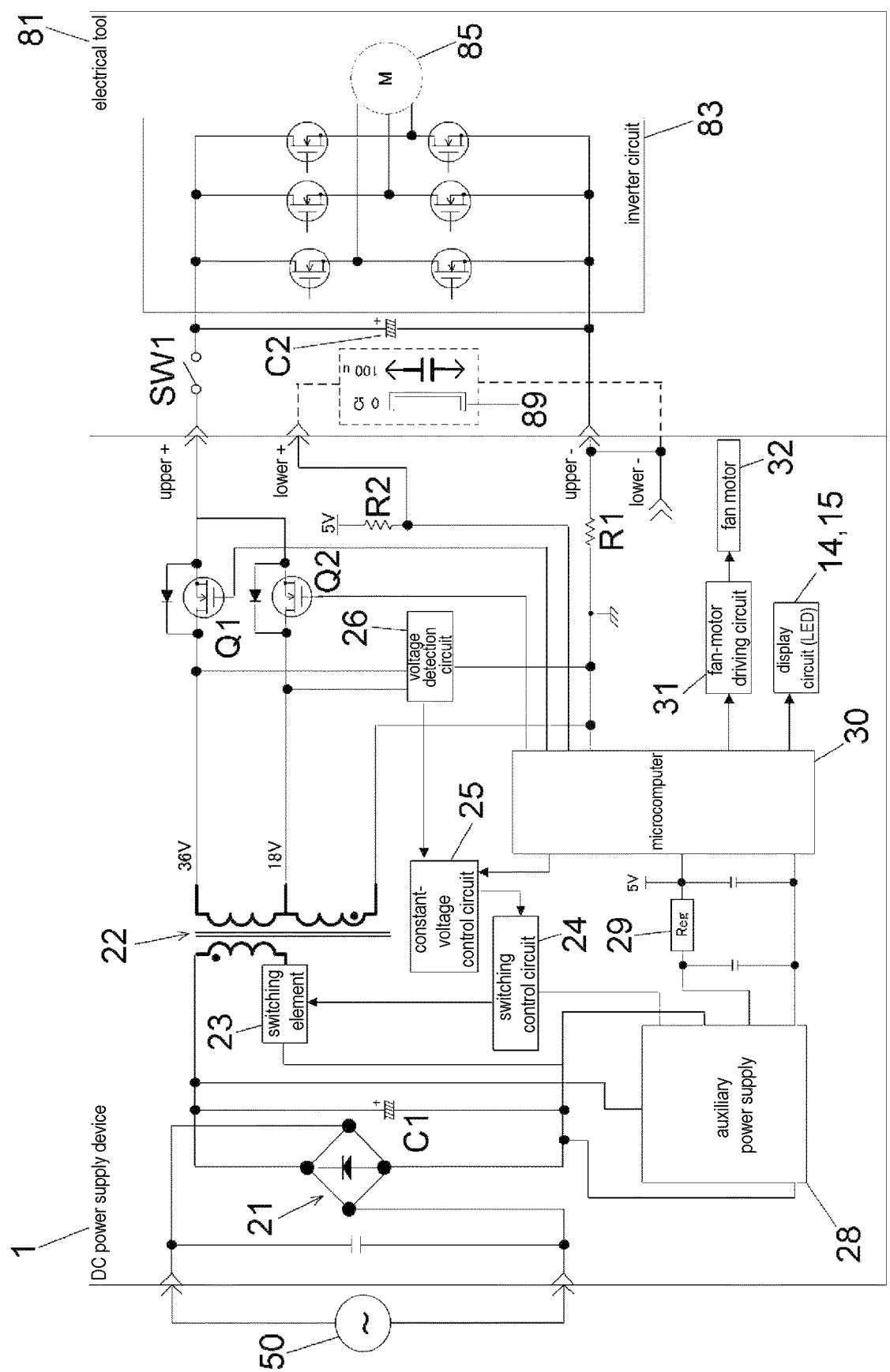
FIG. 10 is a circuit diagram illustrating a state that the DC power supply device 1 is connected to an external AC power supply 50 and an electrical tool 81.

As illustrated in FIG. 6, a first substrate 20, on which terminals 35 (positive and negative terminals and other terminals illustrated in FIG. 10) for connection to the electrical tool are mounted, is arranged (for example, screwed to be fixed) on an upper portion of an internal space of the housing 11. The first substrate 20 is substantially perpendicular to the up-down direction and extends in the front-rear direction serving as a first direction. The terminals 35 are mounted on an upper surface (arranged at a side of the upper surface) serving as a first surface of the first substrate 20. The first substrate 20 is positioned between the air inlets 12 and the air outlets 13 in the front-rear direction. A cooling fan 33 that generates an air flow (cooling air) from the air inlets 12 to the air outlets 13 is arranged at an upper front portion in the housing 11. Dashed-line arrows in FIG. 6 represent flowing of the air flow generated by the cooling fan 33.

A second substrate 40 is arranged at a lower portion of the internal space of the housing 11. Circuit parts such as a transformer 22 (circuit parts that configure the DC power supply device 1 illustrated in FIG. 10) are mounted on the second substrate 40. The circuit parts such as the transformer 22 on the second substrate 40 are arranged on a side of a lower surface serving as a second surface of the first substrate 20 and are positioned between the air inlets 12 and the air outlets 13 in the front-rear direction. The air flow generated by the cooling fan 33 is drawn into the housing 11 from the air inlets 12, cools the circuit parts such as the transformer 22, the terminals 35 on the first substrate 20, the first LED 14, and the second LED 15, and is exhausted out of the housing 11 from the air outlets 13. The first substrate 20 also functions as a rectifying plate (air guiding plate) of the air flow generated by the cooling fan 33.

FIG. 10 is a circuit diagram illustrating a state that the DC power supply device 1 is connected to an external AC power supply 50 and an electrical tool 81. The configuration of the electrical tool 81 is not particularly limited; however, in an example in FIG. 10, the electrical tool 81 includes a brushless motor 85 and an inverter circuit 83 that drives the brushless motor 85. In addition, a capacitor C2 is arranged between an upper positive terminal and an upper negative terminal of the electrical tool 81, and a short bar 89 is arranged between a lower positive terminal and a lower negative terminal of the electrical tool 81. The short bar 89 is a member that causes short circuit between the lower positive terminal and the lower negative terminal. The short bar 89 is present if the electrical tool 81 has a rated voltage of 36 V and is not present (short circuit does not occur between the lower positive terminal and the lower negative terminal) if the electrical tool 81 has a rated voltage of 18 V. Although not illustrated, the electrical tool 81 includes a control unit such as a microcomputer that controls driving of the inverter circuit 83. A switch SW1 arranged on a route of an input current to the inverter circuit 83 is switched on and off through an operation of a trigger (operation unit) by a user.

In the DC power supply device 1, a diode bridge 21 serving as the rectifying circuit is arranged between output terminals of the AC power supply 50. A smoothing capacitor C1, a primary winding of the transformer 22, an auxiliary power supply 28 serving as a control-system power-supply unit are arranged in parallel between output terminals of the diode bridge 21. A switching element 23 such as a FET or an IGBT is arranged on a route of a current supplied from the diode bridge 21 to the primary winding of the transformer 22. The transformer 22 is an isolation transformer, and the auxiliary power supply 28 also includes an isolation transformer. Hence, a connection terminal (input unit) of the DC power supply device 1 to the AC power supply and a connection terminal of the DC power supply device 1 to the electrical tool are insulated from each other.

Both ends of a secondary winding of the transformer 22 are connected to respective output units (upper positive terminal and upper negative terminal) which output a DC voltage to the electrical tool 81. A switching element Q1 such as an FET or an IGBT is arranged between one end of the secondary winding of the transformer 22 and the upper positive terminal. A center tap of the secondary winding of the transformer 22 is connected to the upper positive terminal via a switching element Q2 such as an FET or an IGBT. The center tap is arranged at a position at which winding of the secondary winding is divided by a predetermined division ratio (for example, 1 to 1). The switching elements Q1 and Q2 configure a switching circuit that switches between voltage values of a DC current supplied to the electrical tool 81. A voltage detection circuit 26 is arranged between both ends of the secondary winding of the transformer 22 and between the center tap and the other end of the secondary winding. A current detection resistor R1 is arranged between the other end of the secondary winding of the transformer 22 and the upper negative terminal. Voltages of both ends of the resistor R1 are transmitted to a microcomputer 30 (wiring not illustrated). The upper negative terminal and the lower negative terminal are connected to each other. An output terminal of the auxiliary power supply 28 is connected via a regulator 29 to a power input terminal of the microcomputer 30 serving as the control unit.

An AC voltage (AC current) supplied from the AC power supply 50 is rectified and smoothened by the diode bridge 21 and the capacitor C1 and is input to the primary winding of the transformer 22 and the auxiliary power supply 28. Switching (on/off) of the switching element 23 is controlled by control of a switching control circuit 24, and thereby a voltage in proportion to a winding ratio to the primary winding is induced at both ends of the secondary winding of the transformer 22 and the center tap. A constant-voltage control circuit 25 receives a detection result obtained by the voltage detection circuit 26 and controls an operation of the switching control circuit 24 with control performed by the microcomputer 30. Consequently, switching of the switching element 23 is controlled such that the voltages of both ends of the secondary winding of the transformer 22 are constant at 36 V, or the voltage of the center tap is constant at 18 V.

The microcomputer 30 detects a rated voltage of the electrical tool 81 (for example, detects whether the voltage is 36 V or 18 V) according to the voltage of the lower negative terminal. The short bar 89 that causes short circuit between the lower positive terminal and the lower negative terminal is present if the electrical tool 81 has a rated voltage of 36 V, and the short bar is not present if the electrical tool 81 has a rated voltage of 18 V. Hence, in a state that the electrical tool 81 having a rated voltage of 36 V is connected to the DC power supply device 1, due to the short bar 89, a voltage of the lower positive terminal becomes a voltage (value approximate to 0 V which is the ground potential) obtained by dividing a power-supply voltage of 5 V by resistors R2 and R1. On the other hand, in a state that the electrical tool 81 having a rated voltage of 18 V is connected to the DC power supply device 1, the short bar 89 is not present. Hence, a voltage value of the lower positive terminal is pulled up by the resistor R2 and becomes 5 V. Hence, the microcomputer 30 can detect the rated voltage of the electrical tool 81 connected to the DC power supply device 1 according to the voltage of the lower positive terminal.

When the electrical tool 81 having a rated voltage of 36 V is connected to the DC power supply device 1 (when the voltage of the lower positive terminal indicates the presence of the short bar), the microcomputer 30 performs control so as to switch the switching element Q1 on and switch the switching element Q2 off, outputting a DC voltage (DC current) of 36 V between the upper positive terminal and the upper negative terminal. On the other hand, when the electrical tool 81 having a rated voltage of 18 V is connected to the DC power supply device 1 (when the voltage of the lower positive terminal indicates the absence of the short bar), the microcomputer 30 performs control so as to switch the switching element Q2 on and switch the switching element Q1 off, outputting a DC voltage (DC current) of 18 V between the upper positive terminal and the upper negative terminal.

A fan-motor driving circuit 31 operates according to the control performed by the microcomputer 30 and drives a fan motor 32. The fan motor 32 is a motor that drives the cooling fan 33 illustrated in FIG. 6. The microcomputer 30 controls turning-on and turning-off of the first LED 14 and the second LED 15.

According to the embodiment, the following effects can be achieved.

(1) A conversion part (the diode bridge 21 or the transformer 22) that converts an AC voltage (AC current) into a DC voltage (DC current) is arranged in the adapter unit 10, and the adapter unit 10 can be connected to both the electrical tool having a rated voltage of 36 V and the electrical tool having a rated voltage of 18 V. Hence, an adapter unit 10 having a different shape is not required to be arranged for each rated voltage of the electrical tool, and the embodiment is advantageous in terms of use of common parts.

(2) For example, when a DC voltage of 36 V is supplied to the electrical tool having a rated voltage of 18 V, there is a possibility that elements of the electrical tool will malfunction or break down due to an overvoltage. However, in the DC power supply device 1, a DC voltage matching the rated voltage of the connected electrical tool is supplied, and thus it is possible to reduce the possibility.

(3) The voltages of both ends of the secondary winding of the transformer 22 are used when the DC voltage of 36 V is output, and the voltage of the center tap of the secondary winding is used when the DC voltage of 18 V is output. Hence, the embodiment is highly efficient compared with a case of switching the output voltage by control of the switching element 23 only.

(4) Unlike the battery pack, the DC power supply device 1 can be used for a long time without running out of capacity, and thus the terminal 35 connected to the electrical tool has a temperature higher than that of a terminal of the battery. However, the air flow generated by the cooling fan 33 cools the terminal 35, and thus it is possible to suitably suppress overheating of the terminal 35.

Embodiment 2

Figure 11:
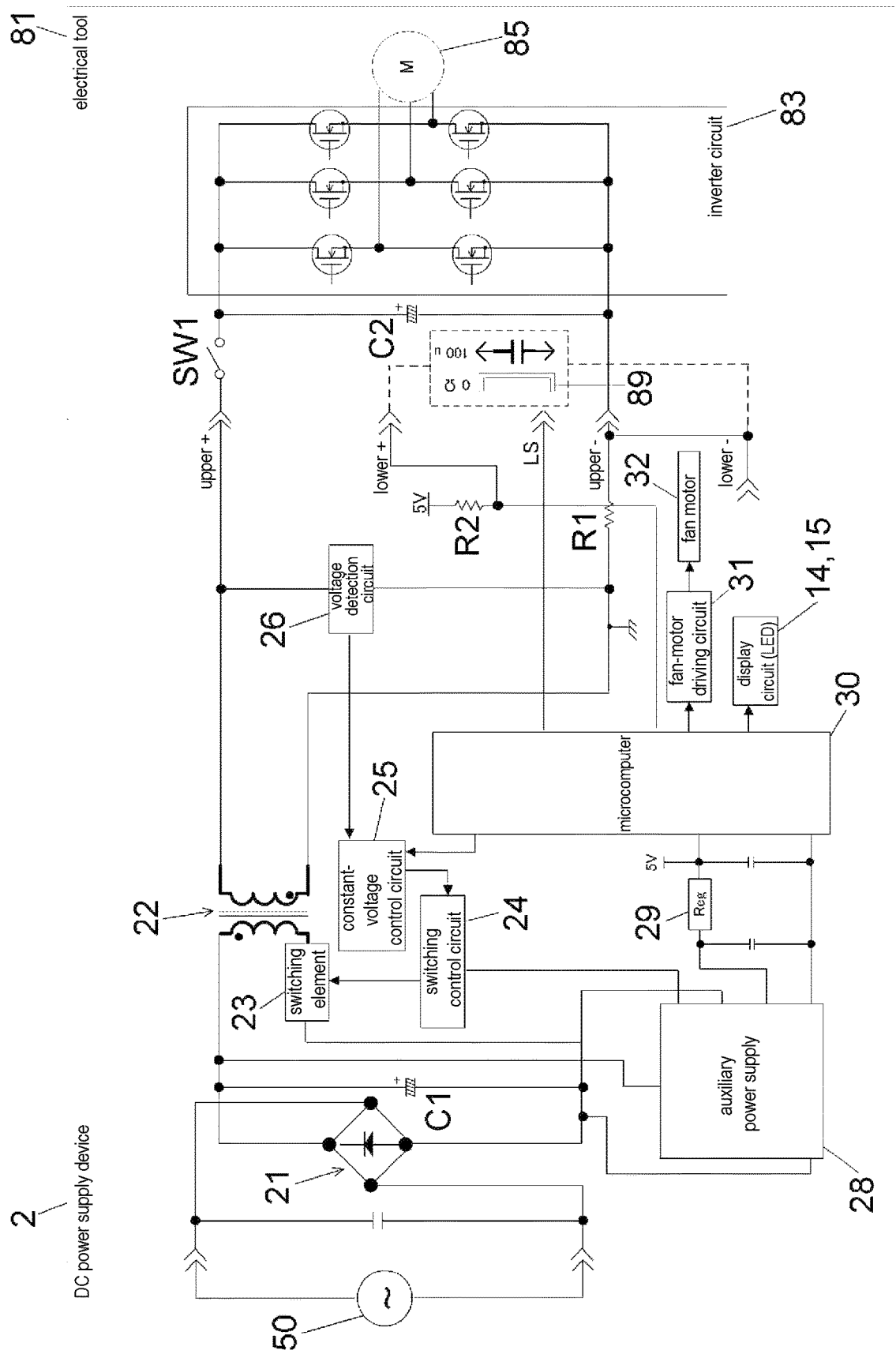
FIG. 11 is a circuit diagram illustrating a state that a DC power supply device 2 according to Embodiment 2 of the present invention is connected to the external AC power supply 50 and the electrical tool 81.

FIG. 11 is a circuit diagram illustrating a state that a DC power supply device 2 according to Embodiment 2 of the present invention is connected to the external AC power supply 50 and the electrical tool 81. Unlike the DC power supply device 1 illustrated in FIG. 10, in the DC power supply device 2, the secondary winding of the transformer 22 does not have the center tap, and the switching elements Q1 and Q2 are not present either. When the electrical tool 81 having a rated voltage of 36 V is connected to the DC power supply device 2, the microcomputer 30 performs control so as to activate the constant-voltage control circuit 25 and enable the switching control circuit 24 to perform switching control on the switching element 23, outputting a DC voltage (DC current) of 36 V between the upper positive terminal and the upper negative terminal. On the other hand, when the electrical tool 81 having a rated voltage of 18 V is connected to the DC power supply device 2, the microcomputer 30 deactivates (stops) the constant-voltage control circuit 25 so as to disable the switching control circuit 24 from performing switching control on the switching element 23 (that is, so as to switch off the switching element 23 serving as a stopping part and cut off an input current to the transformer 22), and stops output of the DC voltage (DC current) between the upper positive terminal and the upper negative terminal. Except for the above aspect, the embodiment is the same as Embodiment 1. According to the embodiment, the DC voltage is not supplied to the electrical tool having a rated voltage of 18 V, and thereby it is possible to reduce the possibility that elements of the electrical tool malfunction or break down due to an overvoltage.

Embodiment 3

Figure 12:
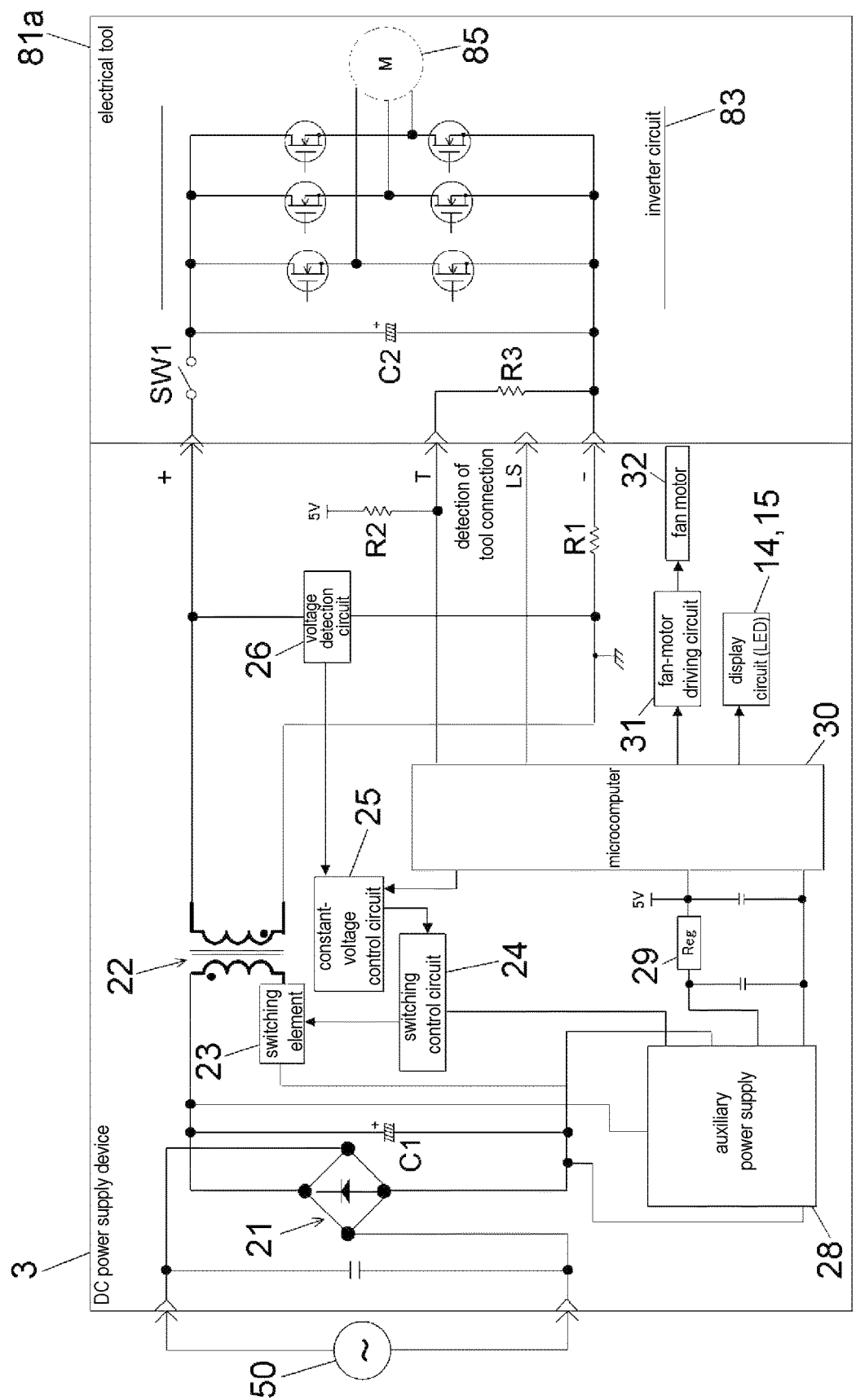

FIG. 12 is a circuit diagram illustrating a state that a DC power supply device 3 according to Embodiment 3 of the present invention is connected to the external AC power supply 50 and an electrical tool 81a. Hereinafter, the description will focus on differences from Embodiment 2 illustrated in FIG. 11. The electrical tool 81a does not have the lower positive terminal and the lower negative terminal of the electrical tool 81 in FIG. 11. A positive terminal and a negative terminal of the electrical tool 81a correspond to the upper positive terminal and the upper negative terminal of the electrical tool 81 in FIG. 11. The electrical tool 81a has a T terminal. A resistor R3 is arranged between the T terminal and the negative terminal.

The DC power supply device 3 does not have the lower positive terminal and the lower negative terminal of the DC power supply device 2 in FIG. 11. A positive terminal and a negative terminal of the DC power supply device 3 correspond to the upper positive terminal and the upper negative terminal of the DC power supply device 2 in FIG. 11. The DC power supply device 3 has a T terminal serving as a connection-state detection terminal. The microcomputer 30 detects presence or absence of connection of the electrical tool 81a according to a voltage of the T terminal. The resistor R3 is arranged between the T terminal and the negative terminal of the electrical tool 81a. Hence, in a state that the electrical tool 81a is connected to the DC power supply device 3, the voltage of the T terminal becomes a voltage obtained by dividing a power-supply voltage of 5 V by resistors R2 and R3. On the other hand, in a state that the electrical tool 81a is not connected to the DC power supply device 3, the voltage of the T terminal becomes 5 V. Hence, the microcomputer 30 can detect whether or not the electrical tool 81a is connected to the DC power supply device 3, according to the voltage of the T terminal (signal from the electrical tool 81a which is received from the T terminal).

When the electrical tool 81a is connected to the DC power supply device 3 (when the voltage of the T terminal indicates the connection of the electrical tool 81a), the microcomputer 30 performs control so as to activate the constant-voltage control circuit 25 and enable the switching control circuit 24 to perform switching control on the switching element 23, outputting a DC voltage (DC current) between the upper positive terminal and the upper negative terminal (supply a DC power supply to the electrical tool 81a). When the electrical tool 81a is not connected to the DC power supply device 3 (when the voltage of the T terminal is 5 V and indicates an opening state, that is, disconnection of the electrical tool 81a), the microcomputer 30 deactivates (stops) the constant-voltage control circuit 25 so as to disable the switching control circuit 24 from performing switching control on the switching element 23 (that is, so as to switch off the switching element 23 serving as the stopping part and cut off an input current to the transformer 22), and stops output of the DC voltage (DC current) between the positive terminal and the negative terminal.

According to the embodiment, the following effects can be achieved.

(1) In a state that the electrical tool is not connected to the DC power supply device 3, the microcomputer 30 performs control so as to switch the switching element 23 off and cut off the input current to the transformer 22. Hence, compared with a case that switching control of the switching element 23 is performed even in the state that the electrical tool is not connected to the DC power supply device 3, it is possible to reduce power consumption of the transformer 22 or the voltage detection circuit 26, and it is possible to reduce power consumption of the DC power supply device 3 as a whole.

(2) In the state that the electrical tool is not connected to the DC power supply device 3, the DC voltage (DC current) is not output between the positive terminal and the negative terminal of the DC power supply device 3, and thus the embodiment is preferable in design.

Embodiment 4

Figure 13:
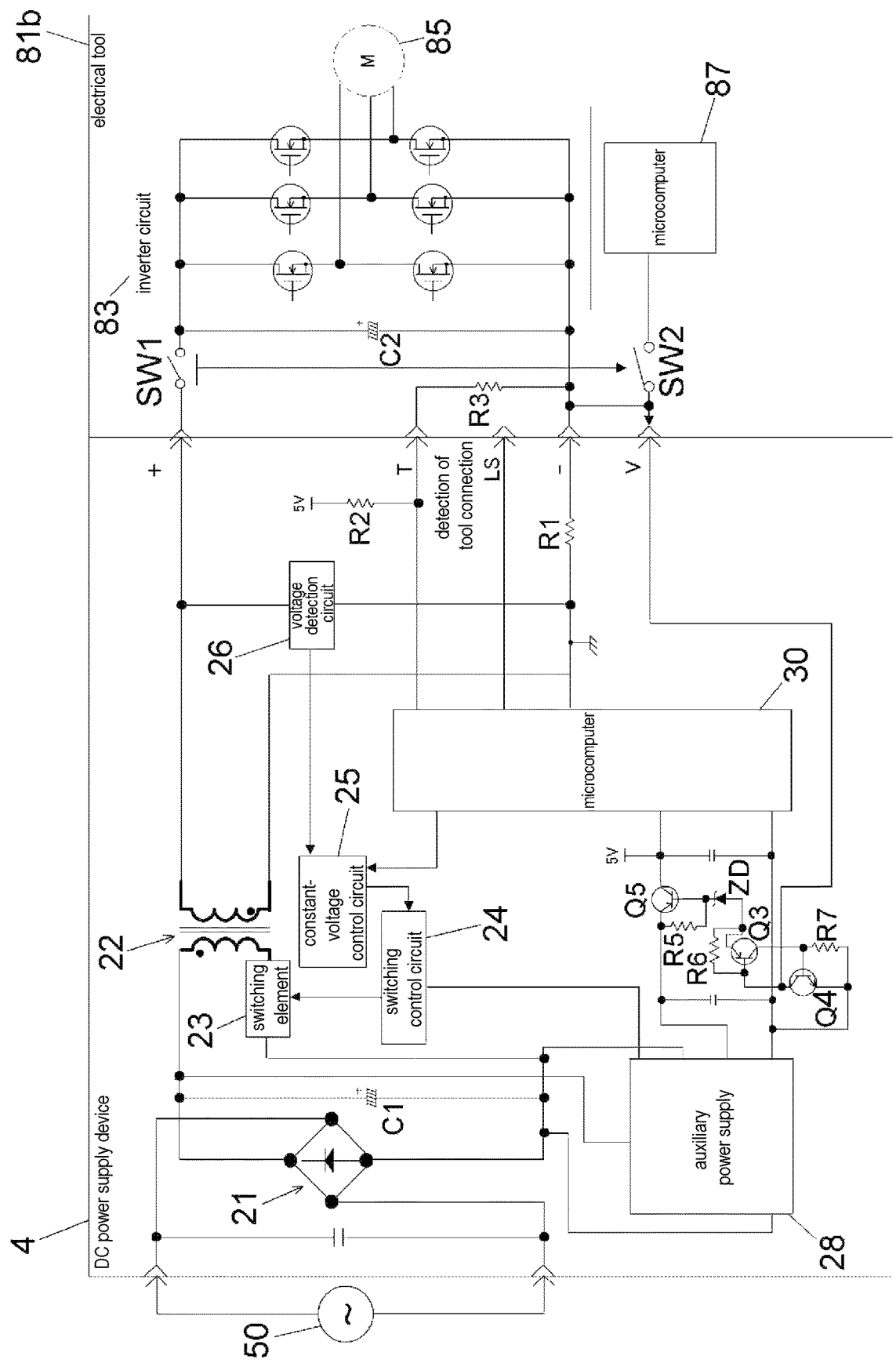
FIG. 13 is a circuit diagram illustrating a state that a DC power supply device 4 according to Embodiment 4 of the present invention is connected to the external AC power supply 50 and an electrical tool 81b.

FIG. 13 is a circuit diagram illustrating a state that a DC power supply device 4 according to Embodiment 4 of the present invention is connected to the external AC power supply 50 and an electrical tool 81b. Hereinafter, the description will focus on differences FIG. 12. The electrical tool 81b has a switch SW2 which is connected to a microcomputer 87 arranged in the electrical tool 81b. One end of the switch SW2 is connected to the microcomputer 87, and the other end thereof is connected to a V terminal. The switch SW2 is switched on and off together with the switch SW1 through an operation of a trigger by a user. When the switch SW2 is switched on, a signal of a ground level is output to the microcomputer 87 and the V terminal.

The DC power supply device 4 includes a cut-off part (cut-off circuit) that cuts off supply of an operation voltage from the auxiliary power supply 28 to the microcomputer 30 when the switch SW2 is switched on in the electrical tool 81b and does not cut off the supply of the operation voltage from the auxiliary power supply 28 to the microcomputer 30 when the switch SW2 is switched off in the electrical tool 81b. The cut-off part includes transistors Q3 to Q5 serving as switching elements, resistors R5 to R7, and a Zener diode ZD. The transistors Q3 and Q5 are PNP transistors, and the transistor Q4 is a NPN transistor. When the switch SW2 is switched on in the electrical tool 81b, a potential of the V terminal serving as a driving-state detection terminal (base potential of the transistor Q3) becomes the ground potential, a current flows in a route from the resistor R5 through the Zener diode ZD, the resistor R6, and the V terminal to the ground, a voltage between a base and an emitter of the transistor Q3 becomes negative due to a voltage drop caused by the resistor R6, and the transistor Q3 turns on. When the transistor Q3 turns on, a current flows in a route from the resistor R5 through the Zener diode ZD and the transistor Q3 to the resistor R7, a voltage between a base and an emitter of the transistor Q4 becomes positive due to a voltage drop caused by the resistor R7, and the transistor Q4 turns on. When the transistor Q4 turns on, a current flows in a route from the resistor R5 through the Zener diode ZD and the resistor R6 to the transistor Q4. A voltage between a base and an emitter of the transistor Q5 becomes negative due to a voltage drop caused by the resistor R5, and the transistor Q5 turns on. Consequently, a constant operation voltage (for example, 5 V) is supplied from a collector of the transistor Q5 to the microcomputer 30.

When the switch SW2 is switched off in the electrical tool 81b, the base potential of the transistor Q3 becomes unstable, no current flows to the resistor R6, the voltage between the base and the emitter of the transistor Q3 becomes zero, and the transistor Q3 turns off. Consequently, no current flows to the resistor R7, the voltage between the base and the emitter of the transistor Q4 becomes zero, and the transistor Q4 turns off. In addition, no current flows to the resistor R5, the voltage between the base and the emitter of the transistor Q5 becomes zero, and the transistor Q5 turns off. Consequently, supply of the operation voltage from the auxiliary power supply 28 to the microcomputer 30 is cut off. Except for the above aspect, the DC power supply device 4 is the same as the DC power supply device 3.

According to the embodiment, the same effects as those of Embodiment 3 can also be achieved. In addition, according to the embodiment, when the trigger of the electrical tool 81b is turned off (when the switches SW1 and SW2 are switched off, and the brushless motor 85 is not driven), the supply of the operation voltage to the microcomputer 30 is cut off and the microcomputer 30 is stopped, and thus it is also possible to reduce power consumption during the connection to the electrical tool 81b.

Embodiment 5

Figure 14:
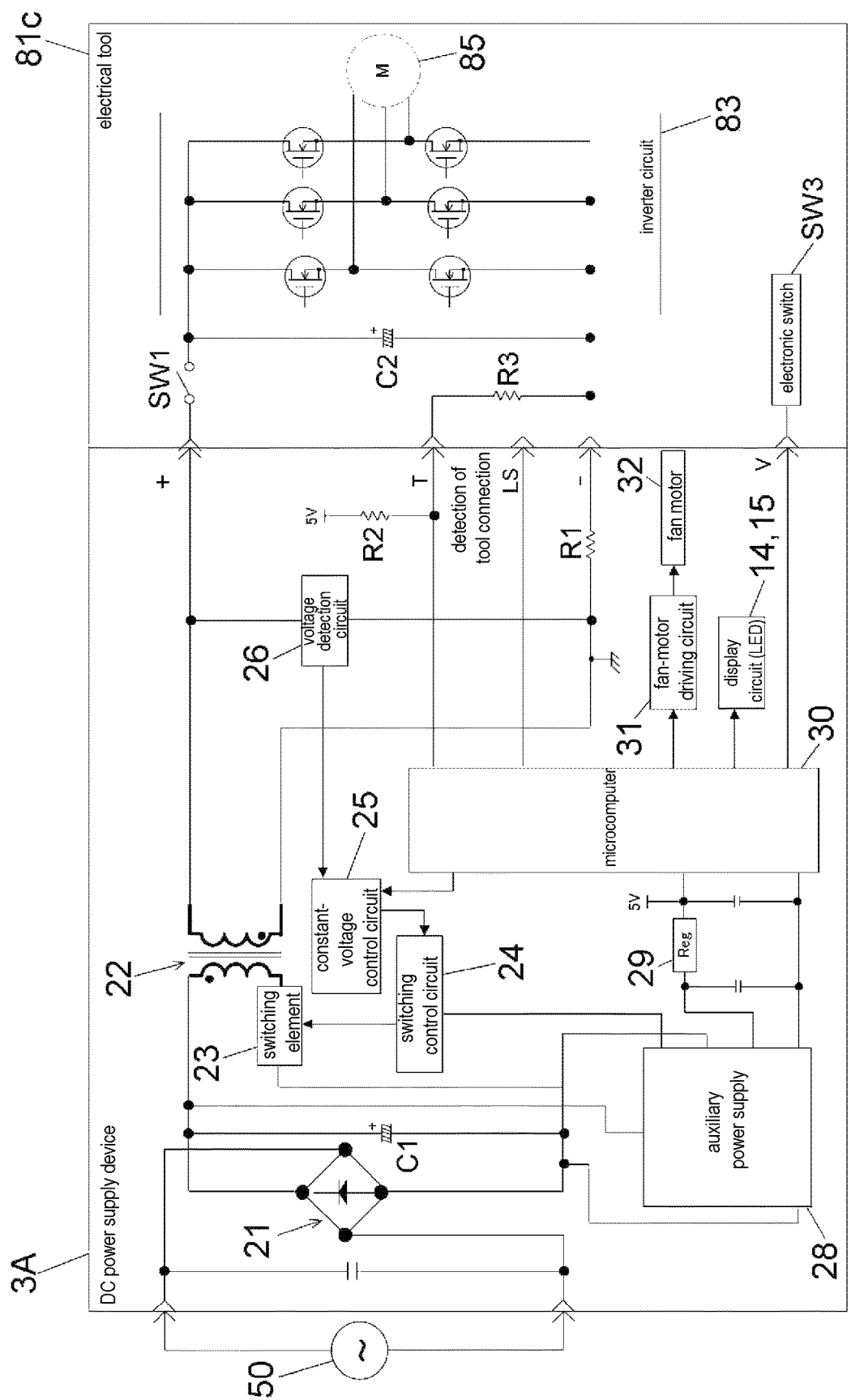
FIG. 14 is a circuit diagram illustrating a state that a DC power supply device 3A according to Embodiment 5 of the present invention is connected to the external AC power supply 50 and an electrical tool 81c.

FIG. 14 is a circuit diagram illustrating a state that a DC power supply device 3A according to Embodiment 5 of the present invention is connected to the external AC power supply 50 and an electrical tool 81c. The electrical tool 81c is the same as the electrical tool 81a in FIG. 12 except that an electronic switch SW3 is arranged. The electronic switch SW3 is switched on and off together with the switch SW1 through an operation of a trigger (operation unit) by the user. The DC power supply device 3A is the same as the DC power supply device 3 in FIG. 12 except that the microcomputer 30 is connected to the electronic switch SW3 of the electrical tool 81c via the V terminal.

The microcomputer 30 detects on and off of the trigger as a state of the electrical tool 81c according to a voltage of the V terminal serving as the driving-state detection terminal that configures a state detection part. When the trigger is operated to be on in the electrical tool 81c, the electronic switch SW3 is switched on, a signal (signal indicating a driving operation of the trigger) from the electronic switch SW3 is transmitted to the microcomputer 30 via the V terminal, and the microcomputer 30 can detect that the trigger of the electrical tool 81c is driven. When the trigger is operated to be off in the electrical tool 81c, the electronic switch SW3 is switched off, the signal from the electronic switch SW3 is not transmitted, and the microcomputer 30 can detect that the trigger of the electrical tool 81c is operated to be stopped.

Figure 15:
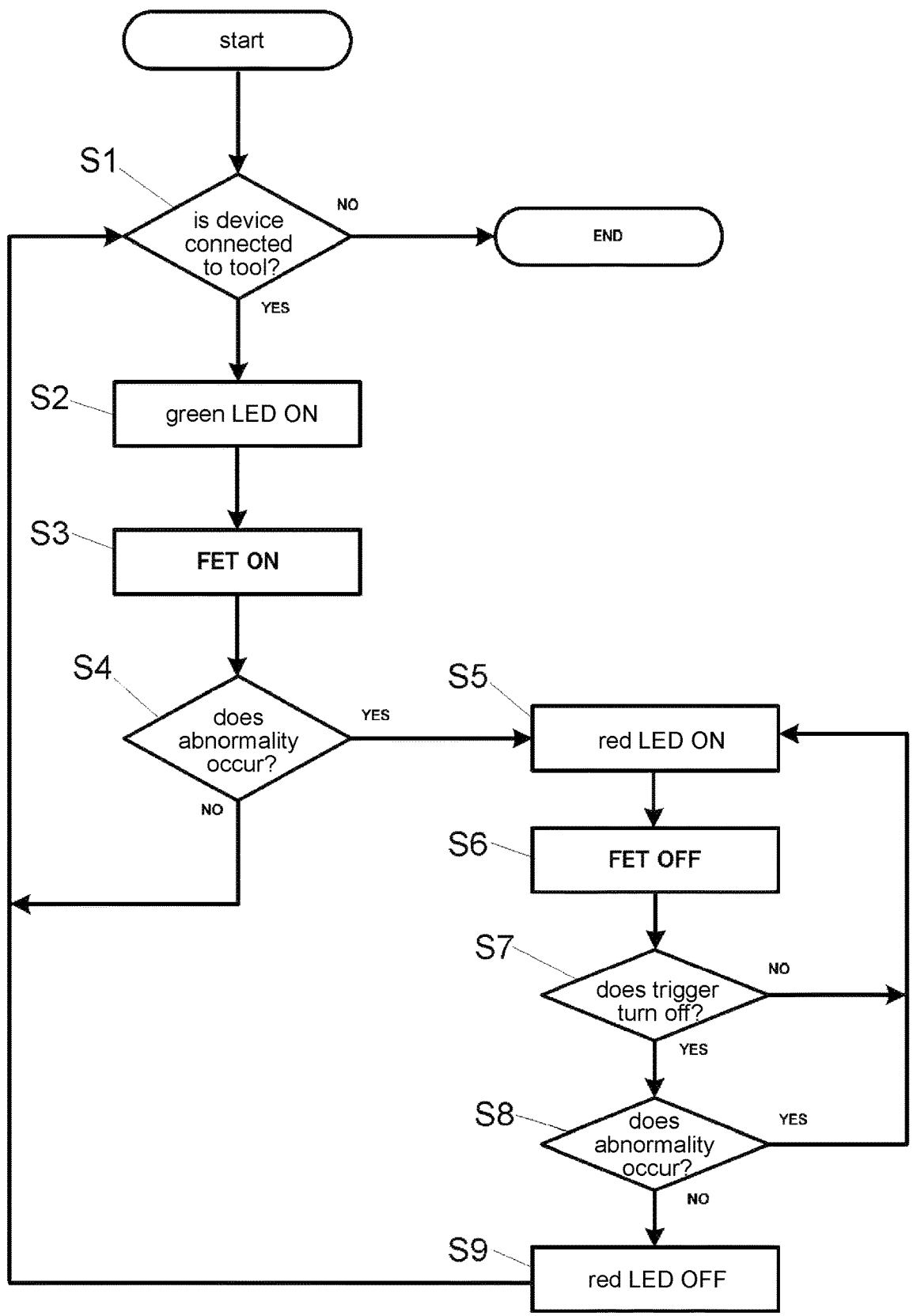
FIG. 15 is a control flowchart of the DC power supply device 3A.

FIG. 15 is a control flowchart of the DC power supply device 3A. When the microcomputer 30 detects that the electrical tool is connected to the DC power supply device 3A (YES in S1), the microcomputer turns on a green LED (example of the second LED 15) (S2) and performs switching control of a FET (example of the switching element 23) (S3). Consequently, an output of a DC voltage (DC current) between the positive terminal and the negative terminal is started. When the microcomputer 30 detects abnormality (YES in S4), the microcomputer turns on a red LED (example of the first LED 14) (S5) and turns off the FET (S6). Consequently, the output of the DC voltage (DC current) between the positive terminal and the negative terminal is stopped. The abnormality includes at least one of temperature abnormality, input voltage abnormality, and overcurrent abnormality of each unit (transformer 22, switching element 23, and the like). A temperature sensor such as a thermistor (not illustrated), an input-voltage detection part (not illustrated), or the current detection resistor R1 functions as abnormality detection part.

After the detection of abnormality (YES in S4), if the trigger is not operated to be off (operated to be stopped) (NO in S7), the microcomputer 30 maintains turning-on of the red LED (S5) and turning-off of the FET (S6) regardless of whether or not an abnormality state is eliminated. In a state that the trigger is operated to be off (YES in S7), when the abnormality state is eliminated (NO in S8), the microcomputer 30 turns off the red LED (S9), and the process returns to step S1.

According to the embodiment, the following effects can be achieved.

(1) If the output of the DC voltage (DC current) between the positive terminal and the negative terminal is stopped (cut off) due to the abnormality, the microcomputer 30 maintains stopping of the output until an off operation of the trigger in the electrical tool is detected. Hence, even when the abnormality is eliminated while the trigger is in an on state, the output of the DC voltage (DC current) from the DC power supply device 3A to the electrical tool is not re-started, and thus it is possible to inhibit unexpected re-starting of the electrical tool for the user, and the feeling of use can be improved.

(2) Because the microcomputer 30 turns on the first LED 14 to notify the user of the abnormality when abnormality is detected, the user can quickly know the occurrence of the abnormality in the DC power supply device 3A, and the DC power supply device 3A is convenient to use.

(3) When the electrical tool is correctly connected (able to supply electric power) to the DC power supply device 3A, the microcomputer 30 turns on the second LED 15 to notify the user of the connection, and thus the user can quickly know the success of the connection, and the DC power supply device 3A is convenient to use.

As described above, the present invention is described with the embodiments as examples; however, those skilled in the art understand that it is possible to perform various modifications on every configurational element or every processing process of the embodiments within a range of the claims. Hereinafter, modification examples will be described.

In Embodiments 1 and 2, an example in which the rated voltage of the electrical tool 81 is detected based on presence and absence of the short bar 89 is described; however, the rated voltage may be detected based on an identification resistor arranged in the electrical tool. In the DC power supply device 1 of Embodiment 1, two levels (36 V and 18

V) of DC voltages can be output to the electrical tool; however, three or more levels of DC voltages may be output.

In Embodiments 3 and 4, whether or not the electrical tool is connected to the DC power supply device is determined based on the voltage of the T terminal; however, a switch such as a button which is pushed when the electrical tool is connected may be arranged in the vicinity of a terminal of the DC power supply device, and the output of the DC voltage (DC current) is stopped if the switch is switched off (if the button is not pushed when the switch is the button).

In Embodiment 5, the condition of output cut-off cancellation when the abnormality is eliminated in the DC power supply device is that the trigger of the electrical tool is operated to be off. However, a switch such as a button for the output cut-off cancellation which can be operated by the user may be separately arranged on the electrical tool or the DC power supply device, and the output cut-off cancellation may be performed if the switch is switched on (if the button is pushed when the switch is a button).

What is claimed is:

1. A DC power supply device that is connected to an external AC power supply and an electrical tool, converts an AC current supplied from the AC power supply into a DC current and supplies the DC current to the electrical tool, the DC power supply device comprising:
   an adapter unit includes a connection unit, detachably connected to a battery attaching/detaching unit of a plurality of electrical tools having different rated voltages via the connection unit;
   a detection part that detects information of the electrical tool that has been connected to the connection unit; and
   a switching circuit that switches between voltage values of the DC current which is supplied to the electrical tool, depending on a detection result obtained by the detection part,
   wherein the connection unit includes a rated voltage detection terminal which is capable of being selectively connected to an electrical tool having a first rated voltage and an electrical tool having a second rated voltage lower than the first rated voltage,
   wherein the detection result includes a rated voltage information of the electrical tools which is connected to the rated voltage detection terminal, and
   wherein the switching circuit sets the voltage value to a first voltage when the detection result obtained by the detection part indicates the first rated voltage, and the switching circuit sets the voltage value to a second voltage lower than the first voltage when the detection result obtained by the detection part indicates the second rated voltage.

2. The DC power supply device according to claim 1, wherein the information comprises information of a rated voltage of the electrical tool that has been connected.

3. The DC power supply device according to claim 2, comprising:
   a connector unit that is connected to the external AC power supply;
   a cable unit having the connector unit at one end; and
   the adapter unit that is arranged at the other end of the cable unit and comprises the detection part, the connection unit, the switching circuit, and a conversion part that converts the AC current supplied from the AC power supply into the DC current,
   wherein the conversion part comprises a rectifying circuit and a voltage transforming circuit, and
   wherein the adapter unit comprises an output terminal that is arranged at the connection unit and outputs the DC current to the electrical tool.

4. The DC power supply device according to claim 3, wherein the adapter unit comprises
   a housing which has an air inlet and an air outlet and accommodates the detection part, the rectifying circuit, and the voltage transforming circuit, and
   a fan which is arranged in the housing and generates an air flow from the air inlet to the air outlet.

5. The DC power supply device according to claim 4, wherein the adapter unit comprises a first substrate which extends in a first direction in the housing,
   wherein the output terminal is arranged on a first surface side of the first substrate,
   wherein the rectifying circuit and the voltage transforming circuit are arranged on a second surface side of the first substrate, and
   wherein the first substrate is positioned between the air inlet and the air outlet in the first direction.

6. The DC power supply device according to claim 3,
   wherein the connection unit is capable of being selectively connected to an electrical tool having a first rated voltage and an electrical tool having a second rated voltage lower than the first rated voltage, and
   wherein the switching circuit outputs, to the output terminal, voltages from both ends on a secondary side of the voltage transforming circuit when the detection result obtained by the detection part indicates the first rated voltage, and the switching circuit outputs, to the output terminal, a voltage between a center tap and one end on the secondary side of the voltage transforming circuit when the detection result obtained by the detection part indicates the second rated voltage.

7. The DC power supply device according to claim 1,
   wherein the information comprises information on a state of the electrical tool, and
   wherein the switching circuit is a stopping part which stops output of a DC voltage to an output unit, depending on the detection result obtained by the detection part.

8. The DC power supply device according to claim 7, comprising:
   an input unit to which an AC voltage from the external AC power supply is input; and
   a voltage transforming circuit arranged between the input unit and the output unit,
   wherein the stopping part stops the output of the DC voltage to the output unit by cutting off an input current to the voltage transforming circuit.

9. The DC power supply device according to claim 7,
   wherein the detection part comprises a connection-state detection terminal which receives a signal indicating connection of the electrical tool, and
   wherein the stopping part stops the output of the DC voltage to the output unit when the detection part does not receive the signal indicating the connection of the electrical tool.

10. The DC power supply device according to claim 7, comprising:
    a control unit which switches between whether or not the stopping part stops the output of the DC voltage to the output unit,
    a control-system power-supply unit which generates an operation voltage of the control unit, and
    a cut-off part that cuts off supply of the operation voltage from the control-system power-supply unit to the control unit, when the stopping part stops the output of the DC voltage to the output unit.

11. A DC power supply device that is connected to an external AC power supply and an electrical tool, converts an AC current supplied from the AC power supply into a DC current and supplies the DC current to the electrical tool, the DC power supply device comprising:
- a state detection terminal which is connected to the electrical tool;
- an abnormality detection part;
- a state detection part that detects a state of the electrical tool which is connected to the state detection terminal;
- an output unit that supplies the DC current to the electrical tool; and
- a cut-off part that cuts off output of the DC current to the output unit when the abnormality detection part detects abnormality,
- wherein, if the output is cut off due to the abnormality, the cut-off part cancels cut-off of the output according to a requirement condition that a predetermined state is detected by the state detection part.

12. The DC power supply device according to claim 11, wherein the cut-off part cancels the cut-off of the output when the abnormality is eliminated and when the predetermined state is detected by the state detection part.

13. The DC power supply device according to claim 11, wherein the predetermined state is a state that a stop operation of an operation unit is performed, wherein the operation unit instructs driving and stopping of the electrical tool.

14. The DC power supply device according to claim 11, comprising:
- a connector unit that is connected to the external AC power supply;
- a cable unit having the connector unit at one end;
- an adapter unit that is arranged at the other end of the cable unit and comprises a connection unit which is connected to the electrical tool;
- a first light emitting unit that turns on when abnormality is detected by the abnormality detection part; and
- a second light emitting unit that turns on when the electrical tool is connected to the DC power supply device,
- wherein the first and second light emitting units are arranged on a side of an extension origin of the cable unit, on a housing of the adapter unit.

* * * * *